C. A. HILL.
HARNESS ATTACHMENT.
APPLICATION FILED APR. 9, 1915.

1,174,067.

Patented Mar. 7, 1916.

WITNESSES

INVENTOR
C. A. HILL

ATTORNEYS

UNITED STATES PATENT OFFICE.

CHARLES A. HILL, OF PITTSBURGH, PENNSYLVANIA.

HARNESS ATTACHMENT.

1,174,067.  Specification of Letters Patent.  Patented Mar. 7, 1916.

Application filed April 9, 1915. Serial No. 20,132.

*To all whom it may concern:*

Be it known that I, CHARLES A. HILL, a citizen of the United States, residing at Pittsburgh, in the county of Allegheny and State of Pennsylvania, have invented certain new and useful Improvements in Harness Attachments, of which the following is a specification.

This invention relates to harness attachment and has for its object, to provide means in a manner as hereinafter set forth, for use in connection with a trace to prevent the forward end of the latter from chafing the side of an animal.

Further objects of the invention are to provide a harness attachment for the purpose set forth which is simple in its construction and arrangement, strong, durable, readily set up with respect to the trace, efficient in its use and inexpensive.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Figure 1:
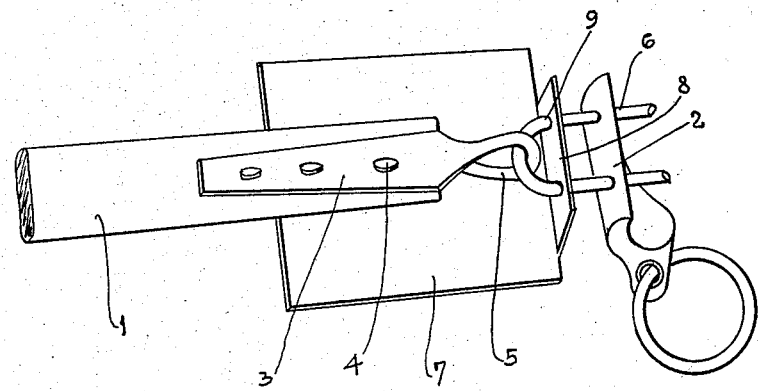
Figure 2:
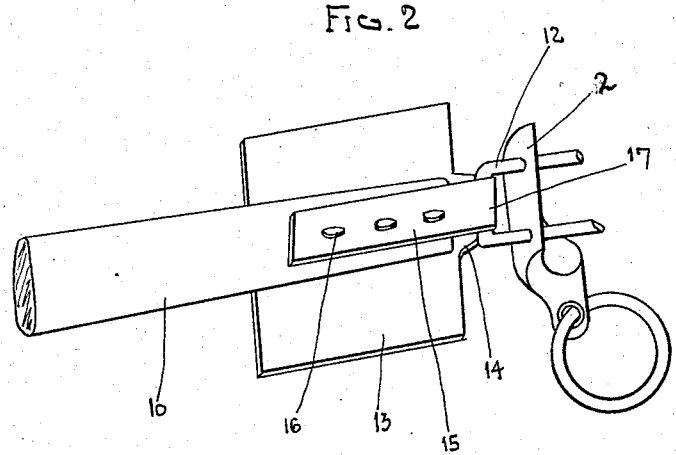

In the drawings wherein like reference characters denote corresponding parts throughout the several views:—Figure 1 is an elevation of an attachment for a harness trace in accordance with this invention. Fig. 2 is a like view of a modified form.

Referring to Fig. 1 of the drawings 1 denotes a trace, broken away, 2 the lower part of the hame clip. 3 a coupling member secured by rivets 4 to the forward end of the trace 1 and said member 3 has a loop or eye 5. The member 3 is connected with the hame clip 2 by a staple 6, the latter extending through the former. The coupling member 3 is arranged on the outer side of the trace 1 and the eye 5 projects from the forward end of the trace 1.

The reference character 7 denotes a plate, which is rectangular in contour and formed of any suitable flexible material. The plate 7 is arranged between the forward end of the plate and the animal and provides means to prevent the said end of the trace from rubbing the animal's side thereby overcoming the possibility of the trace forming a sore on the animal. The plate 7 has its forward end provided with an inwardly projecting flange or extension 8, formed with a pair of openings 9, through which extends the staple 6 whereby the plate 7 is carried by the trace 1.

The connection between the trace 1 and staple 6 allows for the free swinging of the forward end of the trace when occasion so requires.

Referring to Fig. 2 of the drawings, 10 denotes the trace, 2 the hame clip and 12 the staple. Interposed between the trace 10 and the side of the animal is a rectangular plate 13, formed of any suitable flexible material and for the same purpose as the plate 7. At the forward edge of the plate 13, a flange 14 is provided which projects outwardly and terminates in a coupling member 15 extending against the outer face of the trace 10 and secured thereto by rivets 16. The flange or extension 14 in connection with the member 15 provides a loop 17 to which is attached the link 12, whereby the trace 10 is connected with the hame clip 2. The loop 17 allows free swinging of the forward end of the trace 10.

What I claim is:—

1. An attachment for harness comprising the combination with a trace and a hame clip, of a coupling member secured to and projecting forwardly from the forward end of the trace, a plate arranged against the inner face of said end and member and having its forward edge provided with an outwardly projecting flange arranged in advance of said coupling member, and a staple connected with said clip and member and extending through said flange.

2. An attachment for harness comprising the combination with a trace and a hame clip, of a plate arranged against the inner face of the trace, said plate having an extension at its forward end, and securing means comprising a staple coöperating with said extension and securing said trace, plate and clip together.

In testimony whereof I affix my signature in presence of two witnesses.

CHARLES A. HILL.

Witnesses:
LUELLA H. SIMON,
B. E. JENKINS.

Copies of this patent may be obtained for five cents each, by addressing the "Commissioner of Patents, Washington, D. C."